May 18, 1965 J. J. MARTIN 3,184,251
BOGIE EQUALIZER LOCK MECHANISM
Filed April 4, 1963 6 Sheets-Sheet 1

INVENTOR.
J. J. MARTIN
BY Robb & Robb
attorneys

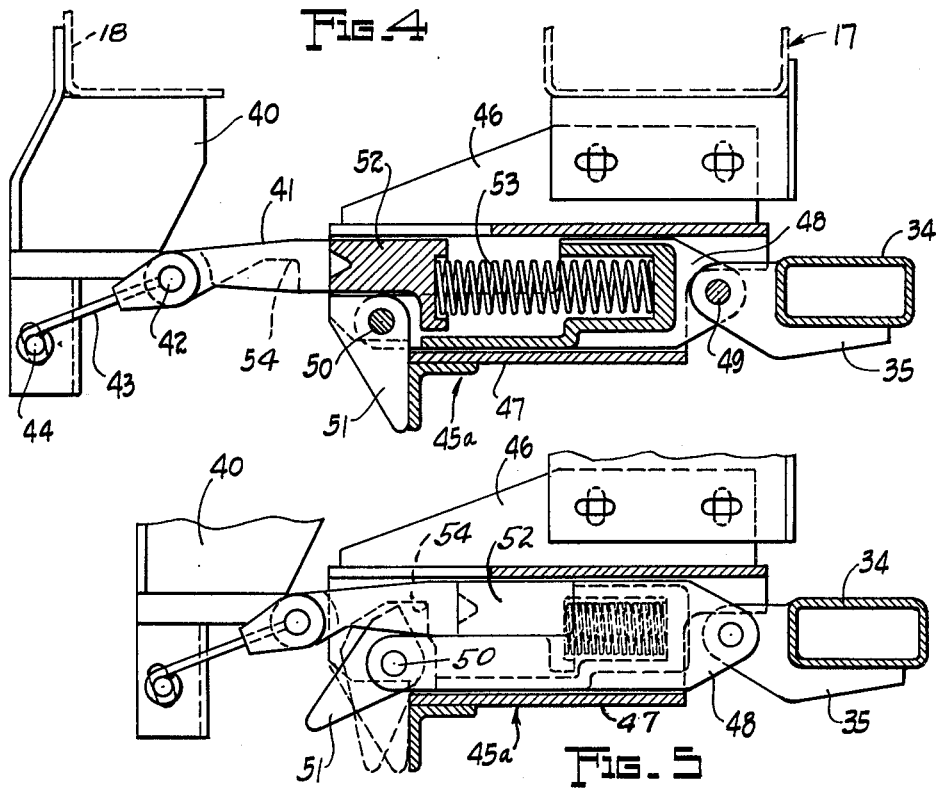
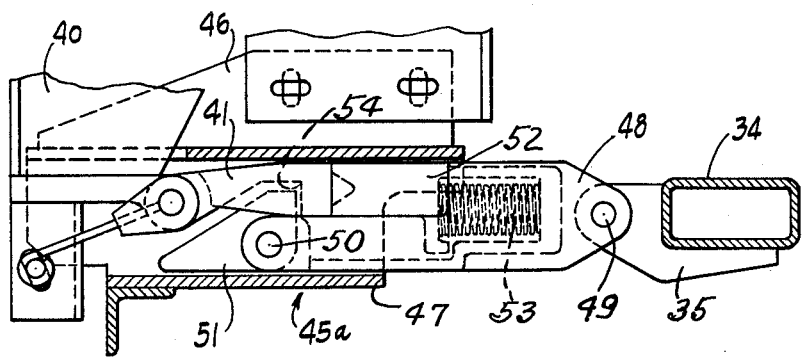

INVENTOR.
J. J. MARTIN
BY
Robb & Robb
Attorneys

INVENTOR.
J.J. MARTIN

May 18, 1965  J. J. MARTIN  3,184,251
BOGIE EQUALIZER LOCK MECHANISM
Filed April 4, 1963  6 Sheets-Sheet 6

INVENTOR.
J.J. MARTIN
BY Robb & Robb
attorneys

United States Patent Office 3,184,251
Patented May 18, 1965

3,184,251
BOGIE EQUALIZER LOCK MECHANISM
John J. Martin, Weatherly, Pa., assignor to Highway Trailer Industries, Inc., Edgerton, Wis., a corporation of Delaware
Filed Apr. 4, 1963, Ser. No. 270,719
5 Claims. (Cl. 280—104.5)

This invention relates to containers and trailer vehicles, and particularly to trailer vehicles which are made up of containers or vice versa.

At the present time structures are used to assemble a trailer unit from containers and facilitating the disassembly thereof for various purposes such as transportation, separation of small loads into smaller lots or other purposes, and to this end it has been found desirable to assemble and disassemble body members which are actually containers in their functional aspects, and yet when assembled become structural units of a body for transport as such.

In the presently contemplated arrangement, uniform sizes and styles of container members are assembled in end to end relationship, usually two, with certain means for connecting the same, these means being susceptible of connection and disconnection so as to facilitate the actual provision of two trailer units from a single trailer unit, the single trailer unit being provided with dual tandem axles and wheels, with the single trailer units being arranged so as to avail of one axle unit each, involving bogies and assembled parts thereof.

The present invention is particularly directed to the interlocking engagement of bogie units which are assembled into a dual tandem arrangement at the rear of a series of containers, usually two, so that the interaction of the axle and spring suspension may be availed of to soften the ride and provide better riding characteristics of the entire unit when it is transported as a trailer as by being towerd by a tractor or the like.

Even more specifically the invention hereof contemplates the provision of certain unique interlocking connections between bogies of a dual tandem unit, with provisions being made to facilitate the separation of the units under the control of the operator and for the purpose of repositioning the respective bogies under a container, whereby each of the containers thereafter become a separate and operable trailer for transport of the contents thereof.

Even more specifically, this invention contemplates the facilitating of the assembly of the tandem axle units so that they are interlocked and at the same time provides for an equalizing action of the axle units of the respective bogie units with separation being facilitated when necessary or found desirable.

Other and further objects of the invention and within the contemplation thereof will be specifically set forth in conjunction with the description of the specification and disclosed in the drawings wherein:

FIGURES 4, 5 and 6 illustrate various positions of the interlocking elements of the respective bogie units, in both assembly and disassembly, with the various motions of the respective parts being clearly defined.

Figure 7:
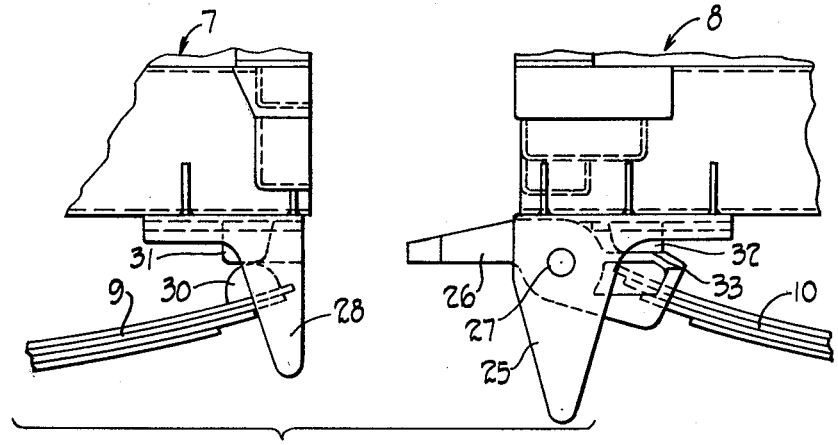
Figure 8:
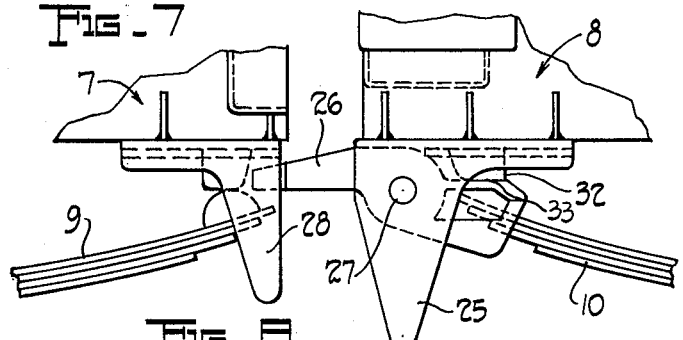
Figure 9:
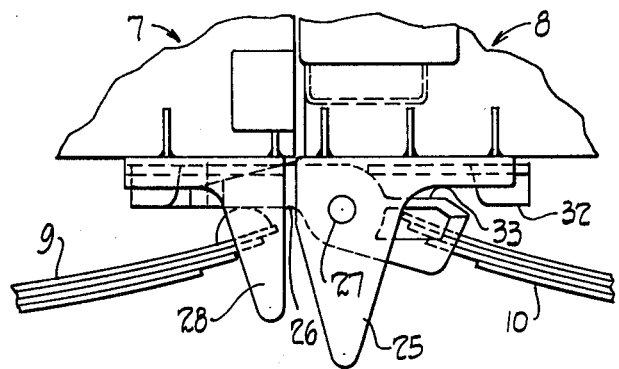

FIGURES 7, 8 and 9 are illustrative and correspond to FIGURES 4, 5 and 6 approximately, the FIGURES 7, 8 and 9 illustrating the various positions of the respective equalizer elements in the motion of the bogie units toward and from one another so as to provide the equalizing action of the spring portions thereof which has been found desirable.

Figure 10:
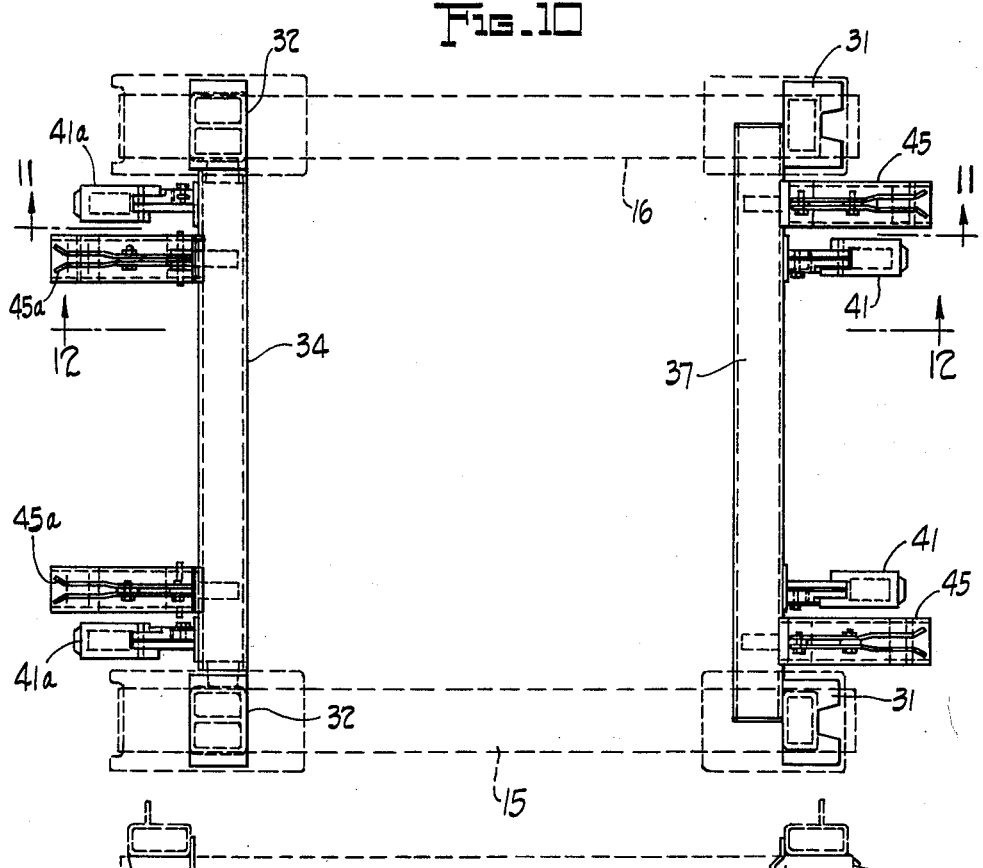

FIGURE 10 is a plan view, somewhat fragmentary in nature illustrating the relationship of certain of the interlocking elements and the location with respect to the bogie, the symmetrical nature thereof being emphasized.

Figure 11:
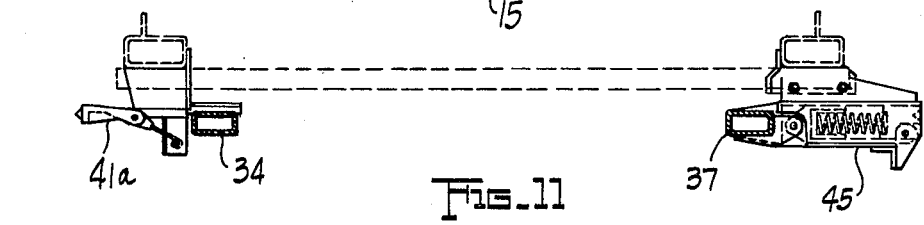

FIGURE 11 is a view taken about on the line 11—11 of FIGURE 10 looking in the direction of the arrows.

Figure 12:
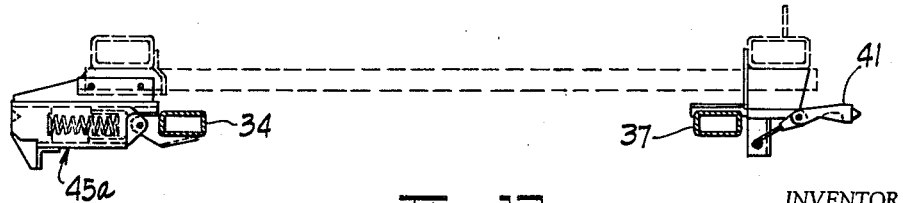

FIGURE 12 is a sectional view taken about on the line 12—12 of FIGURE 10 looking in the direction of the arrows.

Figure 13:
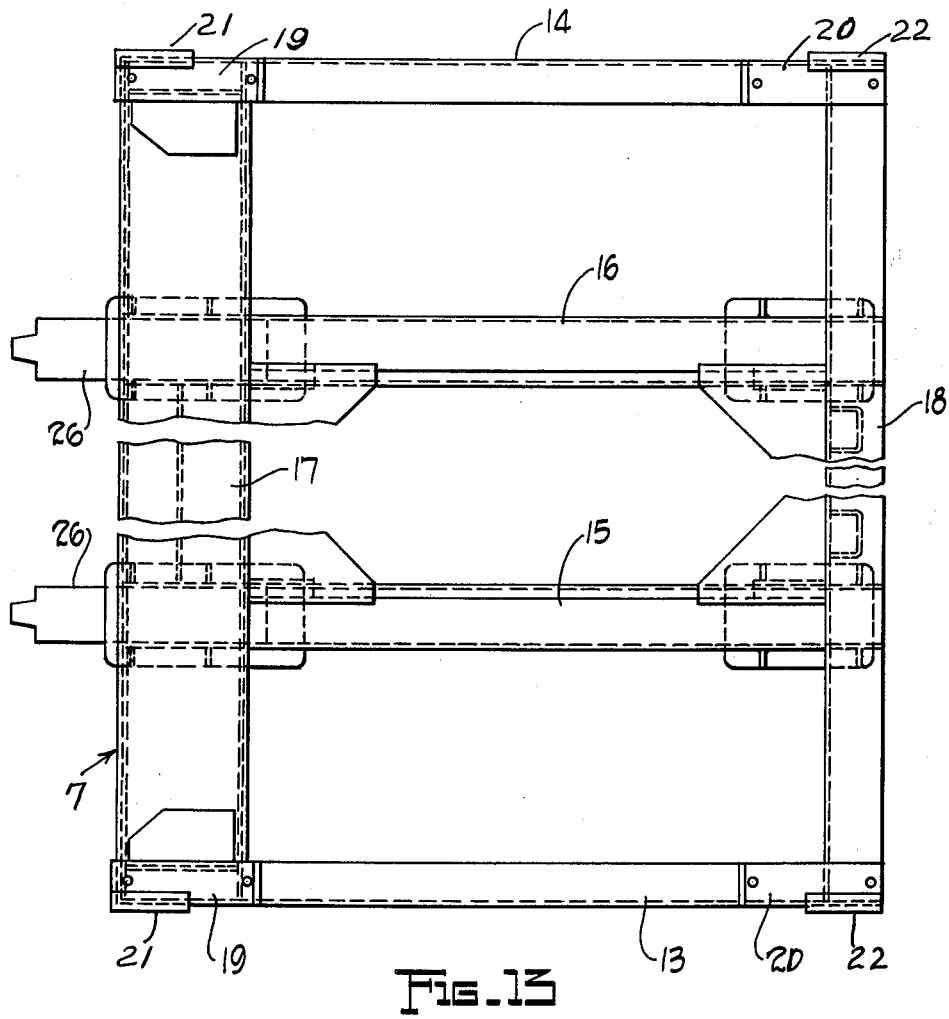

FIGURE 13 is a partially fragmentary view in plan showing a bogie or portions thereof so as to relate inboard and outboard longitudinal frame portions thereof.

Figure 14:
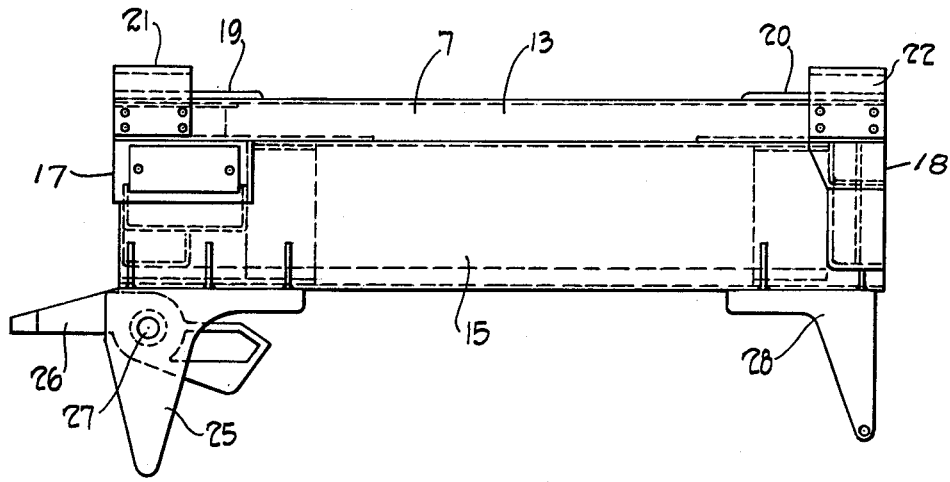

FIGURE 14 is a side elevational view illustrating a bogie frame or sub-frame member and depicting the relative positions of the equalizer or spring hanger members thereof.

Figure 15:
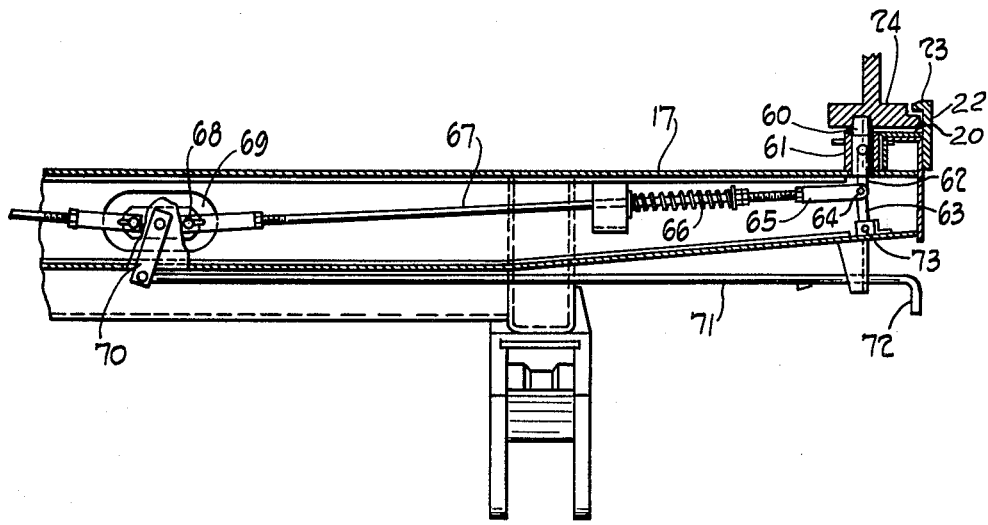

FIGURE 15 is a transverse fragmentary view illustrating certain latch construction which is availed of to position the bogies with respect to the containers or the frames thereof.

Figure 1:
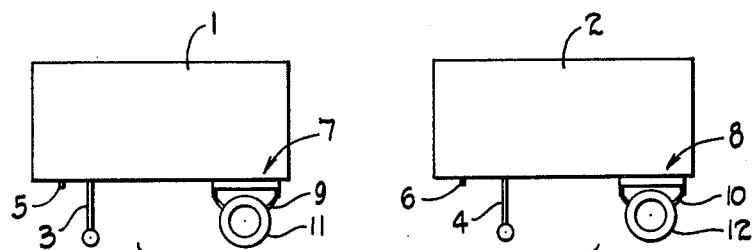
FIGURES 1, 2 and 3 are largely diagrammatic and illustrative of the positioning of trailer units which comprise containers essentially and the connection thereof and locating of the axle units with respect thereto.
Figure 2:
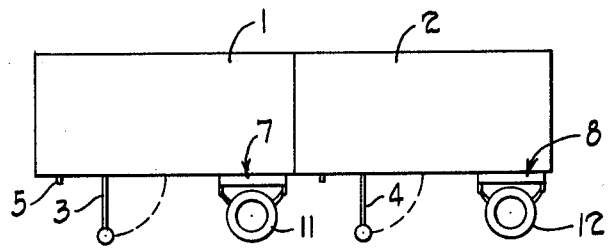
Figure 3:
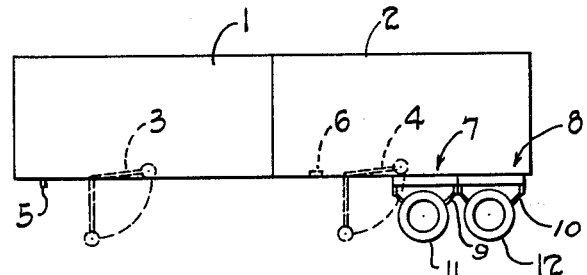

Referring now to FIGURES 1, 2 and 3, being the diagrammatic illustrations of the positioning of body or trailer or container members, and generally there is disclosed a body 1, with a substantially identical body 2 in line therewith, both being of rectilinear configuration and operable as containers or as trailer units as illustrated, the unit 1 including a landing gear 3 and the unit 2 including a landing gear 4, with king pins 5 and 6 respectively.

At the rear and supporting the containers for travel movement when separated in the manner shown, are the bogie units 7 and 8, including the usual springs 9 and 10 with suitable dual wheels 11 and 12 respectively for the respective bogies.

As is illustrated in FIGURE 2, the containers may be brought into juxtaposition so that suitable fastening means provided at their corresponding or adjacent ends will be interengaged and thereby provide a unitary structure, with certain manipulations being resorted to to reposition the bogie 7 into the position shown in FIGURE 3.

In order to move the bogie 7 into the position illustrated in FIGURE 3, the landing gear 3 may be raised into the dotted line position, the king pin 6 likewise, and the landing gear 4 into a similar dotted line position when a tractor is connected to the forward king pin 5 in the conventional manner. By setting the brakes on the bogie unit 7, and drawing forwardly or to the left as illustrated in FIGURE 3, the bogie will be brought into juxtaposition with the rearmost bogie 8, it being realized that both bogies are identical and connected by any suitable means to facilitate sliding movement with relation to the containers or bodies which each support.

It will thereby be apparent that the bogies 7 and 8 are thus in the normal position and comprise what would be termed dual tandem axle units in a container body which is the equivalent of the two containers herein assembled as generally illustrated.

In order to actually utilize the axle unit support for each of the bogies, it is desirable to provide for equalization action to take place between the ends of the springs 9 and 10 and to this end the illustration of FIGURE 14 is resorted to by way of describing the bogie frame for each of the bogies 7 and 8, it being noted that they are identical and include outboard longitudinal frame members 13 and 14 at opposite sides of the bogie frame, with inboard longitudinal frame members 15 and 16 being provided to complete the same and illustrated in FIGURES 10 and 13 likewise.

The outboard frame members 13 as illustrated in FIGURE 14 are connected by a transverse bolster plate or bolster assembly 17 at what will be termed the forward portion or front portion of the bogie frame, and a similar transverse bolster plate or bolster assembly 18 at the rear of the frame.

As will be understood from a consideration of the drawings, the assembly is thereby a substantial structural unit, with wear plates such as 19 and 20 being provided on the outboard frame members 13 and 14 respectively these frame members in turn including hold down and guide members 21 and 22 which as illustrated in FIGURE 15 extend upwardly above the wear plates 19 and 20 and include an inturned flange portion such as 23 adapted to interengage with and slide with respect to a longitudinal frame member 24 which is formed or which forms a part of the container whether the container be denoted 1 or 2 since they are identical and the container 1 being hereinafter referred to by way of illustration where necessary.

From the foregoing it will be seen therefore that the bogie frames such as 7 may slide longitudinally along beneath the container or body 1 so as to be positioned in the position of either FIGURE 1 or FIGURE 3 when desired and according to the circumstances under which the body or container is to be moved from place to place.

It will also be understood that the bogies may be removed entirely from the containers where it is not necessary to provide for wheel support therefor.

Referring again to FIGURE 14, at the forward portion of the bogie frame, the bogie frame in this case being the frame for the bogie 7, there is provided a main equalizer hanger member 25 which is provided with a pivoted equalizer member 26 being pivoted at 27, there being one at each of the opposite sides of the frame as will be readily apparent in connected and integral manner to the inboard frame member such as 15, the frame member 16 obviously being similarly equipped.

At the rear of the frame in each case is a further spring hanger and guide bracket 28, these respective brackets being further illustrated and now to be described in relation to FIGURES 7, 8 and 9.

As will be understood from the figures, FIGURES 7, 8 and 9 show the rearmost fragmentary section of the bogie frame, in this case the forward bogie frame 7 for example and the forward or front portion of the rear bogie frame of the bogie 8, with the equalizer bracket 25 and equalizer member 26 shown in engagement with the spring such as 10 first referred to.

The spring 9 is provided at its rear end with a pad 30 which engages a longitudinally movable pad support 31 operable in a manner to be described subsequently so that the equalizer 26 may assume the position of the pad 31 when the bogie units are brought into juxtaposition as is shown in the two positions of FIGURES 8 and 9.

A longitudinal pad 32 is provided in the bracket 25, and likewise intended to be moved out of position to abut with a corresponding portion 33 of the equalizer member 26 by means now to be described in relation to FIGURES 4 to 6 inclusive and 10 to 12 inclusive.

Referring therefore to FIGURES 10 and 11 and 12 initially, there is illustrated a front push bar so-called and denoted 34 which engages at opposite ends with the pads 32, one for each equalizer 26, this push bar in turn being connected to certain push bar parts more particularly illustrated in FIGURES 4, 5 and 6 and denoted 35. A rear push bar 37 is shown as extending transversely and connected to the pads 31, the arrangement thereof being substantially identical to the FIGURES 4, 5 and 6 disclosure but of the opposite hand as will be understood from further description herein.

Since it will be understood that the right hand portion of FIGURE 10 represents the rear portion of the front bogie of FIGURES 4, 5 and 6, similarly the left hand portion of FIGURE 10 represents or finds its equivalent in the right hand fragmentary views or portions of the views of FIGURES 4, 5 and 6, and proceeding with the description it will be seen that suitably suspended from the rear transverse frame of the bogie is a striker support 40, with a striker 41 pivotally connected thereto at 42 with a suitable leaf spring 43 engaging said striker and adapted to maintain the same in the general attitude disclosed in FIGURE 4 by reason of the connection of the end of the leaf spring with a suitable transverse pin 44.

It will be apparent that the strikers are provided in pairs preferably as seen in FIGURE 10, the strikers 41 being denoted the rear strikers.

These strikers 41 are duplicated at the left hand portion of FIGURE 10 and being designated 41a for purposes of distinguishing the same and these being the so-called forward or front strikers formed as illustrated in the respective views for purposes to be subsequently described.

Suitable mating or interlocking portions intended to be engaged by the strikers are generally designated 45 for the interlocking portions at the rear of the frame and 45a for those at the forward end of the frame, the members 45a being now described in detail since they are the ones which receive the strikers 41 for actuating purposes hereof.

The interlocking members in this instance consist of a pair of members, one only being described and essentially being connected to a transverse frame of the bogie, that is the forward transverse frame or bolster assembly 17 and extending beneath the same from suitable push bar link guide hangers such as 46, these in turn being equipped with push bar link guides 47 of what may be termed hollow or generally tubular form.

The push bar link guides 47 are arranged to receive push bar links 48 for reciprocation in the guides and the links 48 are pivotally connected at 49 to the push bar parts 35.

The links are provided with bearing or guide surfaces the bodies of each terminating in a pivot section through which a pivot 50 extends and from which pivot a dog 51 depends.

Arranged to slide with respect to the link 48 is a link actuator 52 which is confined for movement of limited extent, and between which member and a correspondingly formed portion of the link 48 is interposed a spring 53, which would normally maintain the actuator 52 in the position of FIGURE 4 with respect to the link 48.

As will be seen from a consideration of FIGURE 5, when the striker 41 for example is caused to engage the actuator 52, as by movement of the bogies with respect to one another and carrying the respective parts heretofore described, will cause the initial movement of the link actuator 52 against expansion action of the spring 53 tending to move the link 48 to the right as viewed in FIGURES 4, 5 and 6, to thereby in turn move the push bar 34 connected therewith.

Further movement of the striker 41 will cause the ultimate compression of the spring 53 and thereafter definite movement of the link 48 causing at this time the dog 51 to rotate in a clockwise direction, and being permitted so to do by reason of the mating portion 54 formed in the striker 41 which will permit the dog 51 to rotate. It will thereupon assume the various dotted line positions illustrated in FIGURE 5 in various motion directions and ultimately when the spring has been compressed to its maximum extent, cause the link 48 to move into the position shown in FIGURE 6 in full lines carrying with it the push bar 34 connected thereto.

Since the push bar 34 is connected to the pads 32 obviously these pads will be moved out of position in engagement with the equalizer members 26 such as may be illustrated by FIGURE 9, to thereby permit the equalizer members 26 to operate for equalizing action.

It will be understood that a similar action of the strikers 41a will be effected so that the push bar 37 with which pad carriers 31a are connected will thereby move the pads 31 likewise so that the spring pads 30 will come into conjunction with the equalizer members 26 and the equalizing action thereby be effected or possible to be effected.

In order to maintain the bogies now in the juxtaposed position of FIGURE 9 for example, the latch assembly shown in FIGURE 15 is availed of, and comprises a pair of latches, one at each side of the bogie frame in the form of a vertically movable pin 60, operating in a guide 61, supported at the outer extremity of the bolster assembly 17 for example, a corresponding pin 60 being provided at the opposite side as will be understood.

The pin 60 is in turn connected to a toggle connection comprising an upper arm 62, a lower arm 63 connected at 64 to an adjustable yoke 65, which yoke is spring pressed into the position of FIGURE 15 by means of a spring 66 surrounding the actuating rod 67. The rod 67 is connected to rocking unit 68 by suitable pivot and a lever 69 will rotate the same when actuated by a control lever 71 extending outwardly and provided with a handle portion 72 thereon for manipulation by the operator.

When the handle 72 is grasped and pulled outwardly, it will cause a rocking motion of the lever 69 imparting a motion toward the left of the yoke 65 and because of the pivot 73, the pin 60 will be withdrawn from engagement with the frame 24 with an opening provided therein. A number of openings may be provided along the frame so that the bogies may be positioned in any position desired and of course particularly in the respective locations indicated in the diagrammatic showings of FIGURES 1 and 3.

When it is desired to separate the containers or bodies 1 and 2, release by the handle 72 of the pin 60 will permit the bogie 7 to be separated from the bogie 8 by motion imparted by a tractor with brakes suitably set on the necessary wheels therefor of the assembly such as is shown in FIGURE 3 and thereafter separating action of the strikers will be the result, so that in reverse motion FIGURES 6, 5 and 4 respectively will illustrate the positions of the strikers, at the same time causing a withdrawal or actually a replacement of the respective pads 31 and 32 so that the springs are again in the positions of FIGURE 7.

Thereafter of course the bogies are locked in their respective positions or at least the one which has been moved by means of the pin 60 again engaging siutable openings in the frame member of the container or in a separate frame member if such be provided whereby the containers may thereafter become separate trailers for use in the manner depicted in FIGURE 1.

The interlocking assembly hereof has been found to be very effective and virtually fool proof so that positive action of the push bars is effectuated both to position and reposition the pads to which they are connected and thus make effective the equalizing action which is desirable to be provided.

I claim:

1. In trailer construction of the class described, in combination, a trailer frame, fore and aft bogies engaged with said frame, equalizer means connected to said bogies, and means to effect and maintain interengagement of certain of said equalizer means, comprising operating parts at one end of one of the bogies, reciprocable members at the adjacent end of the other of said bogies, one of said members having interlocking connection with one of the parts mentioned, operable by reciprocation thereof, the operating parts include a striker, the reciprocable members comprise a link means operatively connected at one end to equalizer instrumentalities, the other end of the link means having a dog connected thereto, the dog is arranged to interengage with said striker upon movement thereof to in turn effect movement of the link means aforesaid, and latch means on said bogies releasably engageable with the frame to maintain the members and parts in the interlocked position.

2. The combination as claimed in claim 1, wherein the striker is resiliently positioned, the link means comprises relatively movable parts resiliently maintained in spaced relation, and the dog is pivotally connected to the link means, whereby to move into interengagement with said striker.

3. In trailer construction of the class described, in combination, a trailer frame, fore and aft bogies engaged with said frame, equalizer means connected to said bogies, and means to effect and maintain interengagement of certain of said equalizer means, comprising operating parts at one end of one of the bogies, reciprocable members at the adjacent end of the other of said bogies, one of said members having interlocking connection with one of the parts mentioned, operable by reciprocation thereof, the reciprocable members comprise a lost motion connection and said one member consists of a dog pivotally mounted to move into interlocking position referred to, and latch means on said bogies releasably engageable with the frame to maintain the members and parts in the interlocked position.

4. In trailer construction of the class described, in combination, a trailer frame, fore and aft bogies engaged with said frame, equalizer means connected to said bogies, and means to effect and maintain interengagement of certain of said equalizer means, comprising operating parts at one end of one of the bogies, reciprocable members at the adjacent end of the other of said bogies, one of said members having interlocking connection with one of the parts mentioned, operable by reciprocation thereof, the reciprocable members are positioned in a guide, said members are resiliently related to one another, a dog is pivoted to one of said members, movement of the members in said guide effects movement of said dog into interlocking position, and latch means on said bogies releasably engageable with the frame to maintain the members in the interlocked position.

5. In trailer construction of the class described, in combination, a trailer frame, fore and aft bogies engaged with said frame, equalizer means connected to said bogies, and means to effect and maintain interengagement of certain of said equalizer means, comprising operating parts at one end of one of the bogies, reciprocable members at the adjacent end of the other of said bogies, one of said members having interlocking connection with one of the parts mentioned, operable by reciprocation thereof, the reciprocable members are provided in pairs at spaced positions on the bogies arranged to coact with similarly spaced operating parts, the members are longitudinally reciprocable, guide elements are carried by at least one bogie for supporting said members, the parts are arranged to engage the members and move the same in the guide elements, dogs are connected to the members to interengage certain of the operating parts, the guide elements maintain said dogs in engagement with said parts when said members have been moved by said parts, and latch means on said bogies releasably engageable with the frame to maintain the members and parts in the interlocked position.

References Cited by the Examiner

UNITED STATES PATENTS

| 2,665,142 | 1/54 | Talbert | 280—104.5 |
| 3,004,772 | 10/61 | Bohlen | 280—81 X |
| 3,102,738 | 9/63 | De Roshia | 280—415 |
| 3,108,822 | 10/63 | Tantlinger | 280—104.5 |

A. HARRY LEVY, *Primary Examiner.*